Sept. 5, 1944.  S. MYERSON  2,357,757
METHOD OF MAKING ARTIFICIAL TEETH
Filed May 21, 1942
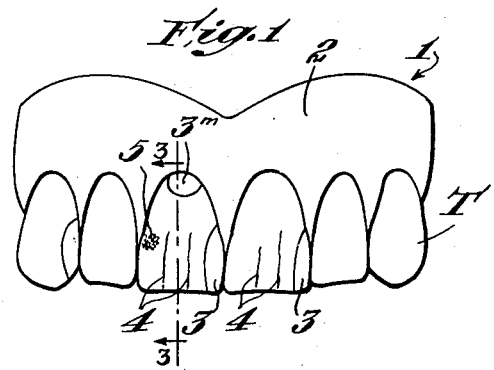
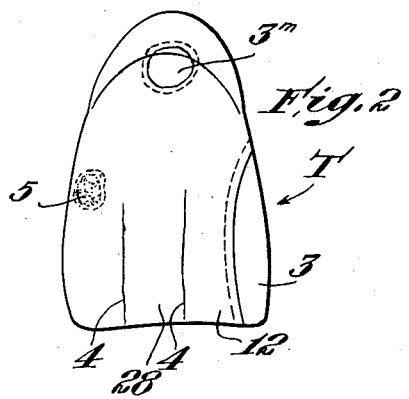
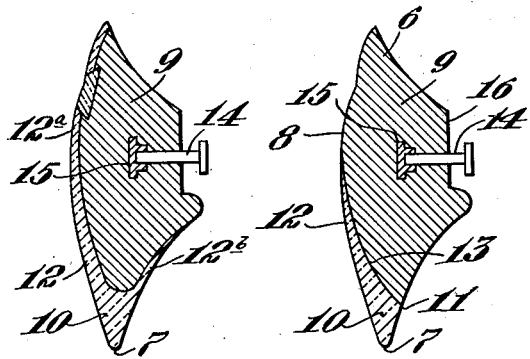
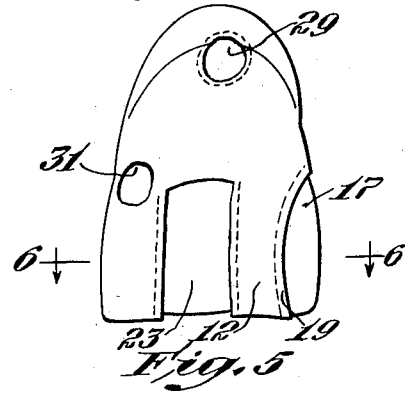
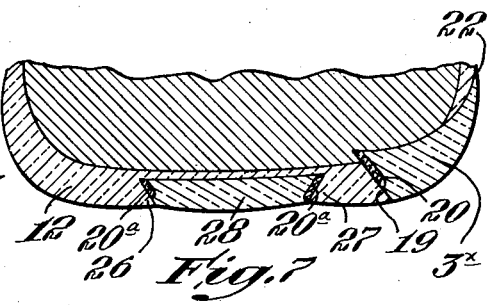
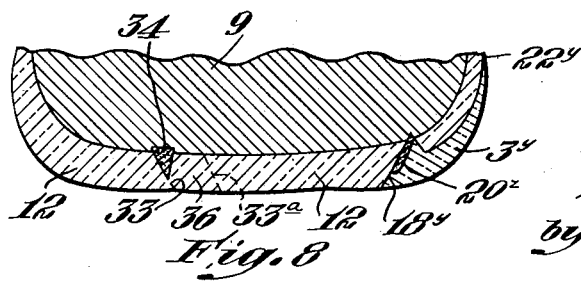
Inventor
Simon Myerson
by Roberts Cushman & Woodbury
Att'ys.

Patented Sept. 5, 1944

2,357,757

UNITED STATES PATENT OFFICE 2,357,757

METHOD OF MAKING ARTIFICIAL TEETH

Simon Myerson, Brookline, Mass.

Application May 21, 1942, Serial No. 443,917

17 Claims. (Cl. 18—55.1)

This invention pertains to the manufacture of artificial teeth and relates more particularly to a novel method of making an artificial tooth as an article of manufacture and sale complete and ready without modification of structure (other than usual procedures incident to fitting manufactured teeth to individual cases) to be incorporated in a denture but so designed as closely to simulate a natural tooth comprising defects in its natural structure and/or which has been filled, the present application being a continuation-in-part of my copending application Serial No. 324,127, filed March 15, 1940, since issued as Patent No. 2,302,375, dated November 17, 1942.

Attempts have previously been made by tooth manufacturers and dentists to make artificial teeth resembling natural teeth in appearance, but despite the most artistic carving and application of stains and glaze by the dentist, most artificial teeth, at least prior to the invention disclosed in my U. S. Patent No. 2,202,713, dated May 28, 1940, have been readily distinguishable from the natural tooth, at least by experienced persons.

Natural teeth are not of uniform appearance nor are the incisal edge portions of natural teeth exactly uniform in color or texture. As a matter of fact the labial surface portion of a natural tooth usually has narrow more or less parallel faint lines or stains extending more or less longitudinally of the teeth. These narrow lines usually result from the presence of fine cracks in the enamel.

As disclosed in the above-named patents, I have devised an artificial tooth which very closely simulates the construction of the natural tooth, as respects the arrangement of the masses of material which constitute the relatively opaque body portion and the relatively transparent enamel, the transparent material being so blended with the more opaque body material that the finished tooth has an incisal area of substantial depth which is so transparent that when the tooth is viewed against the dark background of the oral cavity this area appears as a dark or bluish fringe. The tooth or tooth facing prepared as disclosed in said patent may be manufactured by mass production methods and in a preferred form comprises structural elements so arranged that the tooth exhibits narrow streaks or shadow lines closely simulating those of natural teeth, the streak-forming material being a permanent part of the tooth incorporated during manufacture.

It is common to fill cavities in natural teeth with porcelain fillings but it has been observed that such fillings in natural teeth commonly bleach during use so as to appear a little lighter than the surrounding material of the natural teeth. Furthermore, it is quite common to observe a stained effect at the junction of the filling with the body of the tooth. The present invention concerns a novel method of making artificial teeth on a commercial scale and as a completed article of manufacture and sale and which, in appearance, closely simulates that of a natural tooth having a porcelain filling. In accordance with the present method it is also possible readily and accurately to simulate the whitish or other colored areas which sometimes occur in natural teeth and also, in a manner distinctly different from that disclosed in the aforesaid patent, to imitate the fine enamel cracks or striations of natural teeth.

The result of this improved method of making artificial teeth is that when the tooth, as thus completed by the manufacturer, is mounted in a denture by the dentist and is viewed against the dark oral cavity the incisal portion takes on a dark shadowy appearance like that of the natural tooth under the same circumstances, such appearance varying with different light conditions and changes in perspective as it dies in a natural tooth and at the same time although the teeth may be manufactured by mass production methods they show a lack of uniformity such as occurs in natural teeth and imitate usual defects and repair work common to natural teeth.

Other and further objects and advantages of the invention will be pointed out in the following more detailed description and by reference to the accompanying drawing wherein Fig. 1 is a front elevation of a completed upper denture comprising teeth embodying the present invention;

Fig. 2 is a front elevation, to large scale, illustrating a tooth embodying simulated defects and fillings in accordance with the present invention;

Fig. 3 is a section substantially on the line 3—3 of Fig. 1;

Fig. 4 is a section generally similar to that of Fig. 3 but illustrating a tooth in which the body and enamel are blended in a different manner;

Fig. 5 is a front elevation of a green tooth prepared for incorporation of some of the simulated defects of Fig. 2;

Fig. 6 is a fragmentary section to larger scale substantially on the line 6—6 of Fig. 5, showing stain applied;

Fig. 7 is a similar section showing the green tooth ready for firing; and

Fig. 8 is a fragmentary section illustrating other types of simulated filling and defect.

With reference to the following description it may be noted that the improved tooth herein disclosed may be made in accordance with general modes of procedure in the commercial mass production of artificial teeth except as such method is modified as herein specifically described. Such usual method comprises the packing of suitable slip material into the cavities of complemental mould parts, closing the mould parts and subjecting them to pressure and heat, the subsequent removal of the green teeth from the mould and the final firing of the teeth at a temperature such as to harden and to some extent at least to fuse the ceramic materials of which the tooth is composed.

In order to insure the most natural effects it is desirable to prepare the tooth in general as suggested in my prior Patent No. 2,230,164 dated January 28, 1941, which particularly points out how an artificial tooth may be constructed by the proper combination of relatively opaque body-forming material and relatively transparent enamel-forming material so that when the tooth is viewed against the dark background of the oral cavity, in use, the incisal portion of the tooth will appear to have a dark shadowy fringe. However, while it is desirable that the tooth resulting from the present method be of the specific type just referred to, it is to be understood that the present method is not necessarily limited to the production of teeth having transparent incisal portions such as disclosed in my patent just above mentioned, but that it is applicable to the manufacture of artificial teeth of more conventional types.

Referring to the drawing the character T indicates a tooth of the specific type above referred to, that is to say one having a transparent incisal portion made in accordance with the disclosure of my prior patent. In Fig. 1, teeth of this general type are shown mounted in a denture 1 having the gum-simulating portion 2 from which the anterior teeth project downwardly, some of such teeth being shown as provided with simulated fillings 3 and 3m; others with simulated longitudinal cracks or stains 4, and some having whitish areas 5 such as sometimes appear in natural teeth.

In the simple form of tooth illustrated in Fig. 4 the tooth has the gingival end 6, the incisal edge 7, the labial face 8, the body portion 9 of relatively opaque material, and the incisal generally triangular portion 10 of relatively transparent material, said transparent portion desirably extending downwardly from the lowest point 11 of the body portion a substantial distance, for instance a distance which may be of the order of one-sixteenth inch, such a distance, in normal types of teeth approximating one-third the maximum horizontal distance between the labial and lingual surface of the tooth, it being noted that the depth of the enamel, between the extreme incisal edge and the nearest point of the body portion, substantially exceeds the thickness of the enamel at any other part of the tooth as measured from the outer surface of the enamel to the body portion along a line normal to the exterior surface of the enamel. The incisal mass 10 preferably extends upwardly to form a cusp 12 tapering in horizontal thickness and overlying the lower portion of the labial surface of the body portion. The contact surface or zone 13 at which the body and incisal portions meet and coalesce inclines downwardly and rearwardly from the labial surface of the body portion. As illustrated the tooth is of the kind which is provided with an attaching pin 14 having an embedded anchoring member 15 within the substance of the body portion to which the forward end of the attaching pin 14 is secured, the rear end of the attaching pin projecting outwardly from the upper portion 16 of the lingual surface of the tooth.

In Fig. 3 a tooth of slightly modified construction is illustrated wherein the incisal enamel mass 10 has an upwardly and rearwardly directed cusp 12b, and wherein the forward upwardly directed cusp 12 is extended as a thin layer 12a to the upper end of the tooth. It will be understood that the enamel mass 10 of either of the teeth of Figs. 3 and 4 extends upwardly along the lateral edges of the tooth so as to overlie and embrace the lower part of the body portion.

As above suggested, teeth such as illustrated in general in Figs. 3 and 4 may be made by the usual moulding operations, the body-forming material and the enamel-forming material being properly placed in a mould cavity or cavities and then subjected to pressure and heat thereby to harden and consolidate the material. The moulded tooth, now referred to as a "green" tooth is then removed from the mould.

In accordance with the present invention the green tooth is furnished with one or more cavities in the enamel-forming layer, such cavities extending rearwardly from the labial surface of the tooth and to such depth as may be desired, even under some conditions extending into the body of the tooth. To facilitate production, these cavities may be formed during the moulding operation by simple modification of the usual mould parts. However, since in accordance with the present invention it is desirable in some instances to undercut the cavities, so that the lateral wall or a portion at least of the lateral wall of the cavity slopes rearwardly, making an acute angle with the labial surface of the tooth, it may be preferred (rather than to attempt to make these undercut cavities by moulding) either to mould the teeth with simple straight-walled cavities and then undercut the walls by the use of suitable instruments, for example dental burrs, or merely to mould the green tooth in accordance with conventional practice and then to excavate such cavity or cavities as are desired by the employment of proper instruments. In its broad aspects the present invention is regarded as covering any of these procedures.

Assuming merely for ease of description that the green tooth has been made in general in accordance with usual practice but with substantially straight walled cavities moulded therein, the tooth comprising the body portion 9 and enamel layer 12, the next step in the operation, as herein illustrated, is to undercut said cavity or cavities. For example, assuming that it is desired to provide the tooth with a simulated filling such as shown at 3, Fig. 2, the moulded cavity 17 (Figs. 5 and 6) which has been formed at the desired part of the tooth, at least one of its marginal walls, for instance the wall 18, so undercut that it is inclined with respect to the labial surface of the enamel layer thereby to form an acute angle with said surface, thus providing the overhanging portion 19 of the enamel at that margin. This cavity is now filled with enamel-forming material preferably having optical properties slightly different from those of the layer 12 which covers the labial face of the body portion 9. This filling material, indicated at 3ˣ, Fig. 7, is so disposed as to fill the cavity and to enter behind the overhanging wall 19, but preferably its other margins are tapered to thin edges as indicated at 22 and caused to merge smoothly with the surface of the enamel layer 12. The tooth is now fired, thus causing the filling material 3ˣ to fuse with the main body of enamel 12 and the body 9 while at the same time the enamel 12 and the body portion 9 are preferably permanently interfused In the completed tooth the filling material 3ˣ, being of different optical properties from the remainder of the enamel, will appear as a distinct area of slightly different appearance. Usually the material chosen for this filling is such that the filling in the completed tooth will be somewhat whitish in appearance to simulate the appearance of a porcelain filling in a natural tooth, it being noted that porcelain fillings set in natural teeth have a tendency gradually to bleach and thus to appear a little whiter than the remainder of the tooth. Since as a result of the procedure just described this filling 3 extends in behind the overhanging portion 19 of the enamel 12, its inner margin is visible through said overhanging portion 19, and since the front-to-rear thickness of the part 19 gradually increases, the light which is forwardly reflected or refracted by the filling material which lies behind it varies in intensity, thus increasing the similarity in effect to that of a filling properly anchored in a natural tooth.

It has been found that fillings set in natural teeth often leak slightly at the junction, causing a discoloration or stain, and in order even more closely to simulate the effect of a filling set in a natural tooth, it may be found desirable, in accordance with the present method to apply stain or coloring 20 to the inclined surface 18 (before the filling material 3ˣ is placed in the cavity). The staining or coloring material may be a mere surface application or coating or a layer or mass of any desired thickness and may cover all or any selected portion of the surface 18. The material chosen should be such that it will withstand any fusing operations and after subjection to such operations will have the desired optical properties requisite to emphasize the joint between the filling and enamel layer and to simulate the effect of the stains which commonly occur in filled natural teeth. Such staining or coloring materials are well known in the art. It will be understood that after the stain 20 has been applied, the remainder of the cavity will be filled with the material 3ˣ and that the operations will then proceed in the same way as above described.

If it be desired to provide a plurality of simulated striations or cracks, such as indicated at 4 in Fig. 2, the labial face of the green tooth may be provided with an elongate cavity 23 (Figs. 5 and 6) of a width approximating the distance between the desired cracks 4. As illustrated in Fig. 6 this cavity 23 has lateral walls 24 and 25 each of which slopes rearwardly so as to make an acute angle with the labial surface of the enamel layer 12, thereby providing the overhanging portions 26 and 27 of the enamel 12. The depth of the cavity 23 need not be uniform. As shown in Fig. 7 each of the walls 24 and 25 has been coated with stain-forming material 20ª, the layer on the wall 24 covering only the rear part of said wall while the layer on the wall 25 covers the entire width of said wall. Having introduced these layers of stain-forming material the remainder of the cavity is filled with enamel-forming material 28, Fig. 7, preferably of exactly the same optical properties as the layer 12. Preferably it should be of the same material as the layer 12. When the tooth is fired the enamel-forming material 28 fuses in the same way as the layer 12 and has substntially the same optical properties as the remainder of the labial enamel. If the material 28 is such as to form a transparent enamel, the walls 24 and 25 may be sloped to form obtuse angles with the labial surface of the tooth (walls so sloped being easily produced by moulding) and in that event stain applied to such walls will be visible through transparent enamel resulting from the fusing of the material 28. In the completed tooth the front surfaces of the bodies 20ª of stain-forming material are visible through the overhanging portions 26 and 27 of enamel, and since these overhanging portions gradually increase in thickness, the light reflected from the forward surfaces of the stain-forming bodies gradually diminishes in intensity, with the result that the tooth has the appearance of a natural tooth in which fine cracks have formed in the enamel, permitting the underlying dentine to become stained. Obviously, if it is desired to provide a single one of the cracks 4, then only one of the walls 24 or 25 will be provided with the stain-forming material. In that event, when the tooth is fused, the enamel-forming mass 28 will directly fuse with the enamel 12 at the side unprovided with stain.

Gingival erosion frequently occurs in natural teeth and the resultant cavities are usually excavated by the dentist and filled with synthetic porcelain fillings. Such a filling may be simulated in an artificial tooth, as indicated at 3ᵐ (Figs. 1 and 2). In making such a simulated filling, the green tooth is provided with a cavity at the desired point as indicated at 29 (Fig. 5), the margin of the cavity being undercut, and the cavity is then filled in the same way as the cavity above described.

Some natural teeth have whitish areas, more opaque than the remainder of the tooth, such areas commonly occurring near the gingival end of the tooth. In the production of such an area 5, Fig. 2, the green tooth is furnished with a cavity 31, Fig. 5, at the desired location of this whitish area. This cavity may be of any contour in accordance with the desired shape of the whitish area, as here illustrated being more or less circular. The cavity 31 is filled with opaque whitish material which becomes interfused with the other elements of the tooth during the fusing of the tooth.

In Fig. 8 certain modifications of the above procedure are suggested. Thus the cavity which receives the filling material 3ʸ is provided at its left-hand edge (as viewed in Fig. 8) with a wall 18ʸ which makes an obtuse angle with the labial surface of the enamel layer 12. In fact, this wall 18ʸ forms one side of a substantially triangular groove which defines one edge of the cavity. The wall 18ʸ may, if desired, be coated in whole or in part with stain-forming material as shown at 20ᶻ and then filling-simulating material 3ʸ is filled into the cavity so as to fill the groove and to have its other margins as shown at 22ʸ tapering and gradually merging with the enamel 12ª. Such an arrangement provides a very natural appearance and very closely simulates the filling in the natural tooth, particularly when the filling material 3ʸ is sufficiently translucent to permit the stain to show through it.

In Fig. 8 there is also illustrated an arrangement wherein the stain-simulating material is of substantial mass. As illustrated, the enamel-forming layer 12 has been provided in the green tooth with a cavity having the spaced walls 33 and 33ª. Having provided this cavity, a mass of material 34 having optical properties different from that of the enamel layer is then introduced and arranged so that one of its surfaces engages the inclined surface or wall 33. If desired, this body 34 may be a definitely preshaped mass of ceramic material having any desired optical properties, for example it may be of different color from the remainder of the enamel in the finished tooth or it may be of substantially the same color but having a different index of refraction. The transverse shape of this body may be such as desired and it may extend out substantially to the labial surface of the enamel layer or, as here shown, it may be of such dimensions as to cover only a portion of the inclined surface 33. Having placed this insert 34, in position, the remainder of the cavity is filled with enamel-forming material 36 of the same optical properties as the layer 12. The tooth is now fused and when completed the body 34 imparts to the tooth a distinct appearance due to the reflection or refraction of light from the forward surface or surfaces of this body as viewed through the overlying mass of labial enamel.

While I have hereinabove specifically described that embodiment of the invention which involves the step of moulding the cavities in the green teeth, it is within the scope of the invention to mould the green teeth without cavities, and then to excavate cavities at the desired locations by the use of very hard drills, hand instruments or the like. This latter procedure permits of a great variation on the location, size and shape of the simulated fillings or other defects.

While certain desirable modes of procedure have hereinabove been described as proper for use in obtaining close simulation of natural teeth having fillings or natural defects, it is to be understood that the invention is not necessarily limited to the precise procedures as here described but is to be regarded as broadly inclusive of any and all modifications falling within the scope of the appended claims.

I claim:

1. That method of making an artificial tooth as an article of commerce, complete and ready, without unusual modification of structure, to be incorporated in a denture, which comprises as steps preparing a green tooth having a relatively opaque body portion, a labial layer of enamel-forming material and a cavity in the labial side of the enamel-forming material, applying to the marginal wall of the cavity a staining material of such a nature that in the completed tooth it will have optical properties different from those of the adjacent enamel, filling the cavity with enamel-forming material and firing the tooth.

2. That method of making an artificial tooth as an article of commerce, complete and ready, without unusual modification of structure, to be incorporated in a denture which comprises as steps preparing a green tooth having a relatively opaque body portion, a labial layer of enamel-forming material and a cavity in the labial side of the enamel-forming material, a portion at least of the margin of the cavity overhanging, said overhanging portion having a rear surface which makes an acute angle with the labial surface of the tooth, applying to said rear surface a staining material, filling the cavity with enamel-forming material and firing the tooth.

3. That method of making artificial teeth which comprises as steps preparing a green tooth by moulding body-forming material and enamel-forming material in such a manner that the enamel-forming material constitutes a labial layer, the moulding being so performed as to provide a cavity at the labial side of the tooth, applying stain to the marginal wall of the cavity, filling the cavity with enamel-forming material and firing the tooth.

4. That method of making artificial teeth which comprises as steps preparing a green tooth by moulding body-forming material and enamel-forming material in such a manner that the enamel-forming material constitutes a labial layer, the moulding being so performed as to provide a cavity at the labial side of the tooth, the margin of said cavity overhanging so that the rear surface of said margin forms an acute angle with the labial surface of the tooth, applying stain to a portion at least of said rear surface, filling the cavity with enamel-forming material and firing the tooth.

5. That method of making artificial teeth which comprises as steps preparing a green tooth having a relatively opaque body portion and a labial layer of enamel-forming material, excavating a cavity in the enamel-forming material, applying to the marginal wall of said cavity a standing material, filling the cavity with enamel-forming material and firing the tooth.

6. That method of making artificial teeth which comprises as steps preparing a green tooth having a relatively opaque body portion and a labial layer of enamel-forming material which also constitutes the incisal portion of the tooth, so excavating a cavity in the enamel-forming material that a portion at least of the marginal wall of the cavity overhangs, applying to the rear surface of said overhanging portion a staining material, filling the cavity with enamel-forming material and firing the tooth.

7. That method of making artificial teeth which comprises as steps preparing a green tooth having a relatively opaque body portion and a labial layer of enamel-forming material, so forming a cavity in the tooth that it extends from the labial surface of the enamel-forming layer rearwardly and that a portion at least of the marginal wall of the cavity overhangs, introducing into the cavity enamel-forming material which in the completed tooth will have optical characteristics different from those of the surrounding enamel and which extends behind said overhanging portion, and firing the tooth.

8. That method of making artificial teeth which comprises as steps preparing a green tooth having a relatively opaque body portion and a labial layer of enamel-forming material, forming a cavity in the tooth, so shaping the marginal wall of the cavity that a portion at least of said wall makes an acute angle with the labial surface of the enamel-forming layer, introducing into a portion of the cavity a material which, in the completed tooth, will have optical properties different from those of the surrounding enamel, filling the remainder of the cavity with enamel-forming material and firing the tooth.

9. That method of making artificial teeth which comprises as steps preparing a green tooth having a relatively opaque body portion and a labial layer of enamel-forming material, providing a cavity in the labial side of the tooth, so shaping the wall of said cavity so as to provide a surface which is inclined relatively to the labial surface of the enamel layer, coating said inclined surface with stain, introducing into the cavity an enamel-forming material which in the completed tooth will have the same optical properties as the surrounding enamel and firing the tooth.

10. That method of making artificial teeth which comprises as steps preparing a green tooth having a relatively opaque body portion and a labial layer of enamel-forming material which also constitutes the incisal portion of the tooth, providing the tooth with a labial cavity having an overhanging marginal wall, introducing into said cavity enamel-forming material which in the completed tooth will contract in visual appearance with that of the surrounding enamel and firing the tooth.

11. That method of making artificial teeth which comprises as steps preparing a green tooth having a relatively opaque body portion and a labial layer of enamel-forming material, forming in the enamel-forming material a cavity having lateral marginal walls which extend longitudinally of the tooth and which are undercut so as to overhang, applying a staining material to the rear surface of at least one of said overhanging marginal walls, filling the cavity with enamel-forming material and firing the tooth.

12. That method of making artificial teeth which comprises as steps preparing a green tooth having a relatively opaque body portion and a labial layer of enamel-forming material, incising the enamel-forming material to provide a surface which extends longitudinally of the tooth and which slopes rearwardly and is inclined relatively to the labial face of the enamel-forming material, applying to said inclined surface a stain which, when the tooth is completed, will appear differently from the enamel which is in front of it, embedding said stain in enamel-forming material and firing the tooth.

13. That method of making artificial teeth which comprises as steps preparing a green tooth having a relatively opaque body portion and a labial layer of enamel-forming material, forming a cavity in the enamel-forming layer, said cavity having at least one marginal wall which makes an acute angle with the labial surface, coating the rear face of said overhanging marginal wall with stain, filling the cavity with enamel-forming material which in the completed tooth has substantially the same optical properties as the remainder of the enamel and firing the tooth.

14. That method of making artificial teeth which comprises as steps preparing a green tooth having a relatively opaque body portion and a labial layer of enamel-forming material, forming a cavity in the green tooth extending inwardly from its labial surface, said cavity having opposite portions at least of its marginal wall so undercut as to provide surfaces which make acute angles with the labial surface of the green tooth, so filling the cavity with enamel-forming material that said material underlies said overhanging walls and firing the tooth.

15. Method of making an artificial tooth complete and ready, without unusual modification, to be incorporated in a denture, said method comprising as steps moulding tooth-forming material by the application of heat and pressure to form a green tooth and while so moulding the material, so contouring it that the labial surface of the green tooth has therein a rearwardly directed groove, applying a mass of filling-simulating material to the green tooth so that one margin of said filling-simulating mass is within said groove while its other margins merge smoothly with the labial surface of the green tooth, and firing the tooth, thereby to cause its constituent elements to fuse together.

16. Method of making artificial teeth complete and ready for use by the dentist, said method comprising as steps providing a moulded tooth in the green state, said tooth including a relatively opaque body portion and a main layer of enamel overlying at least the lower portion of the labial surface of the body portion, making a groove in the labial surface of the enamel-forming layer, disposing a staining substance within said groove, said substance being of a color contrasting with adjacent portions of the tooth, so applying filling-simulating material to the labial surface of said layer of enamel that one edge of the filling-simulating material is disposed in said groove, causing the other margins of said filling-simulating material to merge smoothly with the main body of enamel and firing the tooth.

17. That method of making an artificial tooth complete and ready, without unusual modification of structure, to be incorporated in a denture and comprising a body portion and a relatively transparent labial layer of enamel and having embedded in the enamel layer a narrow elongate body of material differing in optical properties from the enamel layer, the front surface of said elongate body being inclined to the labial surface of the enamel layer whereby light which enters through the enamel is reflected toward the observer with varying intensity, said method comprising as steps providing a tooth in the green state, said tooth including a body portion and a layer of enamel-forming material, providing said enamel-forming material with an elongate cavity, one side wall of which is so inclined to the labial surface of the enamel-forming layer that the material of the latter overhangs the cavity at said side, applying to said inclined side wall material having light reflecting or refracting properties different from those of the adjacent enamel and which in the complete tooth will be visible through the enamel in front of it, filling the remainder of the groove with enamel-forming material of the same optical properties as the aforesaid enamel-forming layer, and firing the tooth.

SIMON MYERSON.

CERTIFICATE OF CORRECTION.

Patent No. 2,357,757.  September 5, 1944.

SIMON MYERSON.

It is hereby certified that error appears in the printed specification of the above numbered patent requiring correction as follows: Page 4, second column, line 33, claim 5, for "standing" read --staining--; and that the said Letters Patent should be read with this correction therein that the same may conform to the record of the case in the Patent Office.

Signed and sealed this 31st day of October, A. D. 1944.

Leslie Frazer (Seal)  Acting Commissioner of Patents.